United States Patent
Cai (10) Patent No.: US 10,555,205 B2
(45) Date of Patent: Feb. 4, 2020

(54) METHODS AND ARRANGEMENTS FOR OPTIMIZED SCHEDULED DELIVERY

(71) Applicant: Telefonaktiebolaget LM Ericsson (publ), Stockholm (SE)

(72) Inventor: Xuejun Cai, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 794 days.

(21) Appl. No.: 15/033,095

(22) PCT Filed: Oct. 29, 2013

(86) PCT No.: PCT/CN2013/086134
§ 371 (c)(1),
(2) Date: Apr. 28, 2016

(87) PCT Pub. No.: WO2015/061960
PCT Pub. Date: May 7, 2015

(65) Prior Publication Data
US 2016/0295448 A1    Oct. 6, 2016

(51) Int. Cl.
*H04W 28/02* (2009.01)
*H04W 40/20* (2009.01)
(Continued)

(52) U.S. Cl.
CPC ..... *H04W 28/0226* (2013.01); *H04L 67/2842* (2013.01); *H04L 67/2857* (2013.01);
(Continued)

(58) Field of Classification Search
CPC . H04W 28/0226; H04W 4/028; H04W 24/08; H04W 40/18; H04W 40/20;
(Continued)

(56) References Cited

U.S. PATENT DOCUMENTS

2007/0076707 A1* 4/2007 Link ................. H04L 45/00
370/389
2007/0299794 A1* 12/2007 El-Damhougy .... H04W 40/246
706/15
(Continued)

FOREIGN PATENT DOCUMENTS

CN    1913465 A    2/2007
CN    101971670 A    2/2011
(Continued)

OTHER PUBLICATIONS

International Preliminary Report on Patentability for Application No. PCT/CN2013/086134, dated May 12, 2016, 6 pages.
(Continued)

*Primary Examiner* — Ricky Q Ngo
*Assistant Examiner* — Ellen A Kirillova
(74) *Attorney, Agent, or Firm* — NDWE LLP (57) ABSTRACT

Delivery of delay-tolerant data according to a predicted mobility of a user device in a network-controlled client cache architecture. A network node receives information about a predicted mobility of a user device, and monitors a network status of radio access nodes of a communication network, based on the received information about predicted mobility. Based on the monitored network status, the network node determines when, and via which radio access node, to transfer the requested data. A user device can send information about a predicted mobility of the user devices, together with information about data being requested, and receive information about when to initiate a transfer of the requested data, based on the predicted mobility of the user device. A better utilization of radio resources can be obtained.

27 Claims, 5 Drawing Sheets

(51) Int. Cl.
*H04W 24/08* (2009.01)
*H04W 48/20* (2009.01)
*H04W 4/02* (2018.01)
*H04W 72/12* (2009.01)
*H04L 29/08* (2006.01)

(52) U.S. Cl.
CPC ........... *H04L 67/325* (2013.01); *H04W 24/08* (2013.01); *H04W 40/20* (2013.01); *H04W 48/20* (2013.01); *H04W 72/12* (2013.01)

(58) Field of Classification Search
CPC .. H04W 48/20; H04W 72/12; H04L 67/2842; H04L 67/2857; H04L 67/325
USPC .......................................................... 370/235
See application file for complete search history.

(56) References Cited

U.S. PATENT DOCUMENTS

| | | | | |
|---|---|---|---|---|
| 2010/0214923 | A1* | 8/2010 | Vivanco | H04L 47/10 370/235 |
| 2013/0223308 | A1* | 8/2013 | Chandra | H04W 52/028 370/311 |
| 2013/0272251 | A1* | 10/2013 | Schmidt | H04W 72/12 370/329 |
| 2013/0324104 | A1* | 12/2013 | Cavilla | H04W 72/1242 455/422.1 |
| 2013/0329560 | A1* | 12/2013 | Shomura | H04W 28/0247 370/235 |

FOREIGN PATENT DOCUMENTS

| | | |
|---|---|---|
| CN | 102111819 A | 6/2011 |
| CN | 103179625 A | 6/2013 |
| EP | 1968243 A1 | 9/2008 |
| EP | 2403290 A1 | 1/2012 |
| EP | 2451214 A1 | 5/2012 |
| GB | 2371715 A | 7/2002 |
| WO | 2013088186 A1 | 6/2013 |

OTHER PUBLICATIONS

Extended European Search Report for Application No. 13896606.4, dated May 30, 2017, 7 pages.
International Search Report and Written Opinion, Application No. PCT/CN2013/086134, dated Aug. 4, 2014, 11 pages.
Marta C. Gonzalez et al., "Understanding individual human mobility patterns," Jun. 5, 2008, pp. 779-782, Letters, vol. 453, Nature Publishing Group.
Chaoming Song et al., "Limits of Predictability in Human Mobility," Feb. 19, 2010, pp. 1018-1021, Science, vol. 327, downloaded from www.sciencemag.org, American Association for the Advancement of Science, Washington D.C.
Communication pursuant to Article 94(3) EPC for Application No. 13896606.4, dated Jun. 6, 2018, 5 pages.
First Office Action for corresponding CN Application No. 2013800806454, dated Dec. 3, 2018, 12 pages.
Communication pursuant to Article 94(3) EPC for Application No. 13896606.4, dated Jan. 21, 2019, 5 pages.

* cited by examiner

METHODS AND ARRANGEMENTS FOR OPTIMIZED SCHEDULED DELIVERY

TECHNICAL FIELD

This disclosure relates to methods, arrangements and computer programs for optimized scheduled delivery of delay-tolerant data content.

BACKGROUND

Today's cellular networks for wireless communication are required to support a large variety of content. Some examples of such content that is exchanged in a communication network comprise voice calls, video calls, small and large data files, streaming of audio and video. In addition to these forms of content, the networks transfer this content at various times during the day and night. This typically leads to a highly fluctuating traffic volume during day and night hours. Still further, the traffic volume also differs from one cell to the other.

Thus, when planning and designing capacity in a cellular network, the different peaks of traffic volume or load in the different cells in the network are taken into account. This is done in order to provide a reliable communication network that will, to a large extent, provide requested communication services to all the customers in each cell, also during peak hour traffic.

Because the communication networks are designed to provide or support requested communication services to all the customers in each cell, also during the peak hours, substantial capacity exists in the networks which remains unused during off-peak hours. During off-peak hours, the traffic volume or load is smaller, which means that the capacity which remains unused is wasted. This increases the cost of operating the communication network.

In order to smooth out the traffic volume or load over time, the radio network can control caching of information communicated which need not be delivered in real-time.

In PCT/IB2011/003074 discloses to use a client caching that is network controlled, which is also called optimized scheduled delivery architecture for delivering delay-tolerant content. This transfer to mobile terminals takes into account the load in the communication network. A network cache having a direct interface to the radio access network can initiate transfer of data to the client when the radio conditions are suitable. The client cache can be used by multiple applications and is owned by the end-user, rather than by an operator. An interface is defined between the two caches for delayed data transfer on both data plane and control plane level. The interface allows both the network cache and client cache to control the data transfer. This solution enables transfer of delay-tolerant content to clients whenever is optimal from a radio and client perspective.

Since the network load is dynamic, the load at the time of scheduled delivery may look different from the one as determined by the network cache.

For this reason a complementary approach for optimized scheduled delivery can be preferred at times.

SUMMARY

It is an object of example embodiments of the invention to address at least the issue outlined above. This object and others are achieved by a network node, user device, methods therein, and computer programs according to the appended independent claims, and by the embodiments according to the appended dependent claims.

A first example embodiment provides a method in a network node in a communication network for enabling transferring requested delay-tolerant data content to a user device. The method comprises receiving information about a predicted mobility of the user device. The method also comprises monitoring a network status of radio access nodes of the communication network, based on the received information about predicted mobility of the user device. In addition the method comprises determining when, and via which radio access node, to transfer the requested delay-tolerant data content, based on the monitored network status of the radio access nodes.

A second example embodiment provides a network node that is adapted to enable transferring requested delay-tolerant data content to a user device. The network node comprises a logic module that is adapted to receive information about a predicted mobility of the user device. The logic module is further adapted to monitor a network status of radio access nodes of a communication network to which the network node belong, based on the information about the predicted mobility of the user device. In addition, the logic module is adapted to determine when, and via which one of the radio access nodes, to transfer the requested delay-tolerant data content, based on the monitored network status of the radio access nodes.

A third example embodiment provides a method in a user device for enabling transferring delay-tolerant data content between the user device and a network node in a communication network. The method comprises receiving a request for delay-tolerant data content. The method also comprises sending to the network node information about a predicted mobility of the user device and information about the requested delay-tolerant data content. In addition, the method comprises receiving information about the time when to initiate a transfer of the requested delay-tolerant data content, based on the predicted mobility of the user device.

A fourth example embodiment provides a user device that is adapted to enable transferring delay-tolerant data content between the user device and a network node in a communication network. The user device comprises a client module that is adapted to receive a request for the delay-tolerant data content. The client module is further adapted to send to the network node, information about a predicted mobility of the user device and information about the requested delay-tolerant data content. In addition, the client module is further adapted to receive information about when to initiate a transfer of the requested delay-tolerant data content, based on the predicted mobility of the user device.

A fifth example embodiment provides a computer program for enabling transferring requested delay-tolerant data content to a user device from a network node of a communication network. The computer program comprises computer program code which, when run in a processor of the network node, causes the network node to receive information about a predicted mobility of the user device. The computer program code also causes the network node to monitor a network status of radio access nodes of a communication network to which the network node belong, based on the information about the predicted mobility of the user device. In addition, the computer program code, when run in the processor, causes the network node to determine when, and via which one of the radio access nodes, to transfer the requested delay-tolerant data content, based on the monitored network status of the radio access nodes.

A sixth example embodiment provides a computer program for enabling transferring requested delay-tolerant data content between a user device and a network node in a communication network. The computer program comprises computer program code which, when run in a processor of the user device, causes the user device to receive a request for the delay-tolerant data content. The computer program code causes the user device to send to the network node, information about a predicted mobility of the user device and information about the requested delay-tolerant data content. In addition, the computer program code, when run in the processor, causes the user device to receive information about when to initiate a transfer of the requested delay-tolerant data content, based on the predicted mobility of the user device.

By considering the radio condition of several cells or service set identifier (SSID) of radio access nodes, transfer of requested data content can be delivered in a cell or SSID when the load is low or the throughput is high. An efficient utilization of radio resources can thus be obtained. An optimal timing for transfer can be obtained.

For example, if a current cell throughout has a high load according to history statistic, and if it is predicted that a user device will visit a low load cell or a SSID of a high throughput radio network, for instance Wi-Fi, before a deadline specified by user device, the data content can be transferred in those low load cells or high throughput Aps. For this reason, traffic can be off-loaded from highly loaded cells, with the result of an improved quality of experience.

BRIEF DESCRIPTION OF THE DRAWINGS

Example embodiments will now be described in more detail, and with reference to the accompanying drawings, in which.

DETAILED DESCRIPTION

In the following description, different example embodiments of the invention will be described in more detail, with reference to accompanying drawings. For the purpose of explanation and not limitation, specific details are set forth, such as particular scenarios and techniques in order to provide a thorough understanding.

When a network cache schedules content delivery to a user device, it could only consider the radio condition of the current cell of the user device. The content requested can be delivered when the current cell is in low load before a pre-defined deadline. However, it is not optimal in some cases.

For example, according to radio load statistics of a current cell, the network cache scheduled that the content will be delivered to user device after for instance thirty minutes, but before the lapse of that time period, the UE may have moved to another highly loaded cell. Then the content requested by the user device has to be delivered in the new cell, which will increase the traffic load of the new cell which is already highly loaded.

In another example, pone that the current cell has a high load, and to guarantee that the requested content be delivered to the user device by a deadline, the network cache may have to determine to transfer the content at a time at which the load of the current cell is still high. However, the user device moves to another low load cell or access network, e.g., Wi-Fi, which can provide better throughputs before the lapse of the deadline. The determined transfer or delivery is thus not optimal in these examples.

The present invention is therefore in particular related to the delivery of delay-tolerant data content according to a predicted mobility of a user device in a network-controlled client cache architecture.

In real life, the user device is likely to have moved into another area in which the attached cell or even the type of radio access network is different from the one of the attached cell at the time the prediction of the user device mobility was made.

Figure 1:
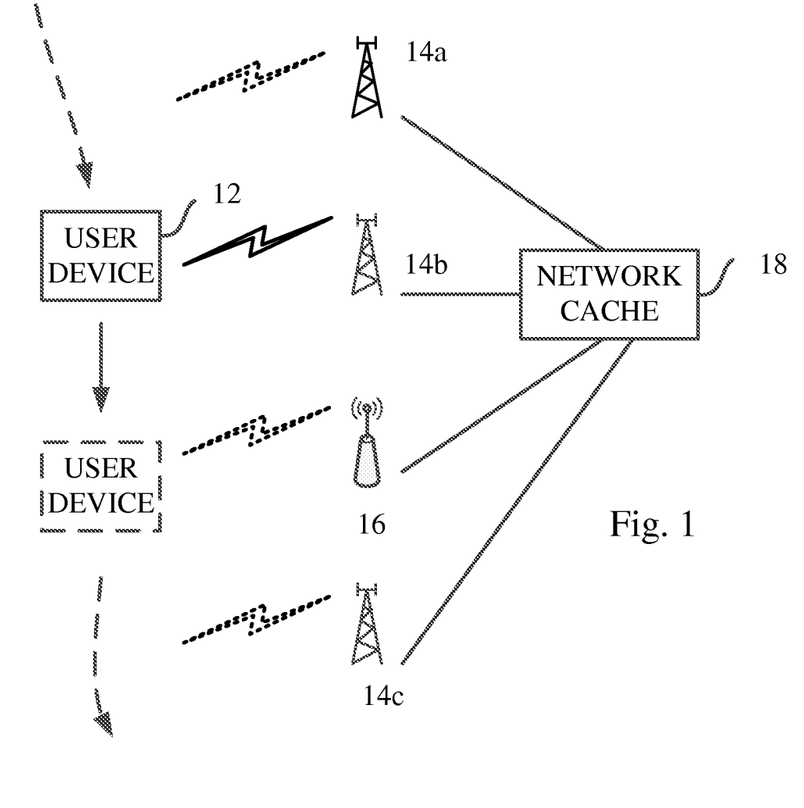
FIG. 1 schematically illustrates a scenario in a communication network related to embodiments of the present invention.

FIG. 1 schematically illustrates a scenario in a communication network related to embodiments of the present invention. FIG. 1 presents a user device 12, radio access nodes 14a-c in the form of base stations, and a radio access node 16 in the form of an access point. The radio access network is thus different from 14a-c and 16. Moreover, FIG. 1 discloses a network cache 18 of the communication network.

For embodiments of the present invention, it is typically not enough to consider radio conditions of only the current cell to which the user device is attached. Rather, radio conditions of cells and radio coverage areas along a predicted mobility path are considered and taken into account for an optimized data content transfer.

As indicated in FIG. 1, user device 12 moves and typically attaches different radio access nodes along its movement. The used device moves from being attached to radio access node 14a to be attached to radio access node 14b. Now, the user device 12 is predicted to move in a direction towards an access point 16. From being close to the access point the user device 12 is predicted to reside within a cell of radio access node 14c.

Large scale statistical studies have shown that most people have regular daily routines of moving and traveling. This provides an opportunity for predicting and estimating a person's movement given that this person has been observed for some time. A very high (93%) potential predictability in user mobility has been reported.

Within embodiments of the present invention, a network cache may obtain a user device's predicted mobility by two possible ways: 1) A centralized entity residing on a network side of a communication network and maintain all user devices' history mobility information. This centralized entity can predict user device's mobility according to user device history information; 2) The user device maintains history mobility information by itself, and then sends the predicted mobility information to network cache through a pre-defined interface. The mobility information typically comprises cells or Access points (APs) that the user device is predicted to visit or attach, and the time period of each such stay.

After receiving predicted mobility information of the user device, the network cache could find an optimized location, in terms of a cell or coverage of AP, and the time to deliver the requested content to the user device. The decision may be made by considering the requested content properties, e.g. data content size, specified deadline, and radio condition of the access networks that the user device is predicted to visit.

By providing a direct connection between the network cache and radio access node, enabling quick feedback about available radio resources, resource efficient transfer can be performed.

As will be shown down below, mobility of user devices can be predicted by either the user device itself or by a centralized network entity, for instance, a mobility prediction engine or even obtained from another party via the Internet.

Figure 2:
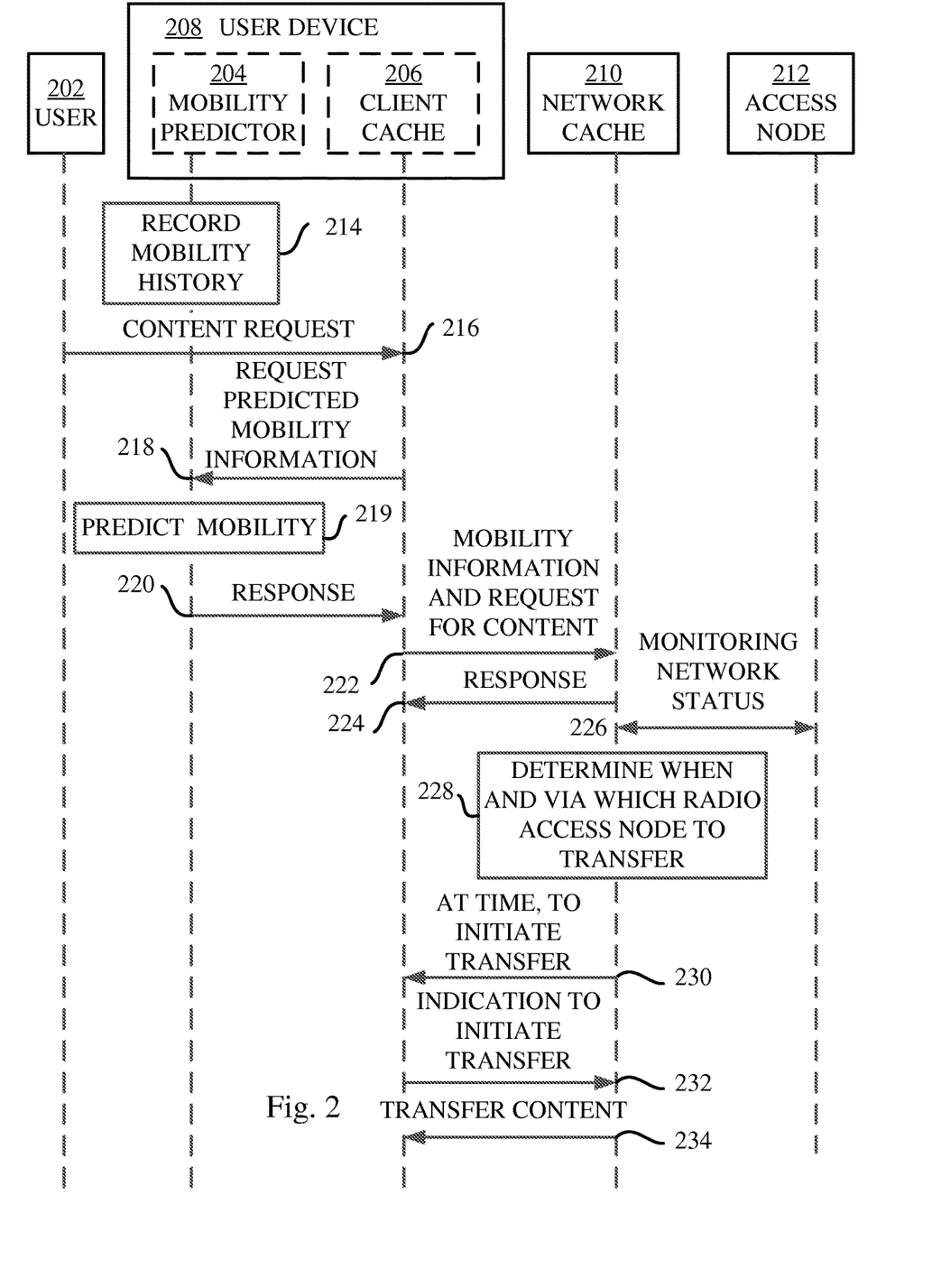
FIGS. 2 and 3 are hand-shake diagrams illustrating embodiments of the present invention.

FIG. 2 presents a hand-shake diagram for a case in which the user device predicts the mobility itself. Signalling is performed between a user 202; a user device 208; comprising a mobility predictor 204 and a client cache 206; a network cache 210 and an access node 212.

It is noted that the network cache 210 can be considered as one example of a network node.

Whereas the current hand-shake diagram relates to down-link transfer of data content that is requested, embodiments of the present invention also relate to up-link transfer of requested data content.

In 214 the mobility predictor 204 of the user device 208 records the mobility history. In 216 the user 202 sends a request for data content to the user device. This request may comprise a deadline for transfer of requested data content. The requested data content may be specified by a uniform resource location (URL) address.

This request is herein received by the client cache 206. If the client cache does not comprise the requested data content, said data content will have to be requested from a network. Since the data for this reason will have to be transferred over a radio access network, the client cache 206 requests predicted mobility information in 218 from the mobility predictor 204. In 219 the mobility predictor 204 predicts the mobility of the user device 208.

Predicting mobility based on stored history information may be performed in a number of different ways which are well-known for a person skilled in the art, for which reason it is herein not discussed how to perform a mobility prediction.

The mobility predictor 204 can be responsible for collecting and storing history mobility information, and predicting a future location of the user device based on the stored history information.

In 220, the mobility predictor 204 provides a response to the request for predicted mobility information. This response to the client cache 206 therefore comprises the predicted mobility information. This predicted mobility may comprise current cell of the user device 208, next several cells and cell stay time for said cells. Alternatively, the predicted mobility information may comprise on or more coverage areas of access points, with predicted stay time.

Having received the predicted mobility information in 220 the client cache 206 sends 222 the predicted mobility information and the request for data content to the network cache 210. This sending 222 uses a direct connection between the radio access node to which the user device is attached and the network cache.

This direct connection is a so called "over the top" connection which uses transfer control protocol/internet protocol (TCP/IP) protocol for communicating with the network cache having an IP address on its own.

The client cache 206 can be responsible for storing pre-fetched content, communicating with the network cache 210, receiving the request from a graphical user interface (GUI) of the user device 208 or upper layer applications. In addition, it communicates with the mobility predictor 204 to get the predicted mobility information of the user device 208 and sends it to the network cache 210.

The GUI can be used by the end user to input pre-fetch/delayed-upload content request manually, but also to receive a notification from the client cache 206. Upper layer Apps can also send content pre-fetch requests through a pre-defined interface/application programming interface.

In the network cache 210, a pre-cache logic module can be the central component of the network cache, which is in charge of controlling the data transfer between the client cache 206 and the network cache 210. Its main functions may comprise: receiving content request from a user device, the request including a uniform resource location (URL) of the specified requested content, mobility prediction information of the user device, and some other information such as desired deadline; monitoring radio conditions through an interface to radio access network node, for example, radio base station (RBS), AP, NodeB, depending on radio access network type; and controlling the time and place to deliver the content to user device.

In addition, a database may also be comprised in the network cache, which database comprises rules and algorithms for delivering the requested content based on different criteria, like: current radio conditions, for example available radio capacity, radio access type, deadline set by user, etc.

A content request & mobility database may further be provided in the network cache and can comprise information of content requested by the user device UE, for example, content URL, deadline for transfer, predicted mobility information and etc.

Moreover, a content storage can be provided in the network cache for temporarily containing the content that to be delivered to user device or uploaded by user device, according to a different use case.

Now, continuing the hand-shake diagram of FIG. 2, in 224 the network cache sends a response to the client cache 206 to indicate whether the request is successful or not. If the network cache has no access to the requested data content the request is typically not successful, alternatively if a deadline for receipt of requested data content has already lapsed.

In 226 the network cache 210 communicates with radio access nodes, for example access node 212, and monitors a status of the network. The network cache 210 can obtain current and statistical radio condition of the cell to which the user device is attached and of cells that the user device is predicted to visit. As indicated above, the radio access network may comprise multiple radio access types, for example 3G/long term evolution (LTE) and 802.11 of radio communication.

In 228 the network cache 210 determines when and via which radio access node to transfer the requested data content. For example, based on predicted mobility information, radio conditions, content size and the deadline, the network cache 210 determines an appropriate cell and time to deliver the requested data content to the user device requesting said data content. Load and throughput for each cell or service set identifier (SSID) along a predicted path may thus be considered.

The content size may be considered in that a cell and time is preferred, for which the entire content can be transferred while the user device is predicted to remain in said cell. Another cell and time for transfer, for which the entire requested data content is predicted not be transferred before the user device visits a next cell, will thus not be preferred, but may be chosen for reasons of for instance approaching lapse of deadline. The network cache thus determines and selects a time and a cell/coverage area for the transfer of requested data content.

In 230, at the selected time from 228, the network cache 210 sends a message to the client cache to initiate transfer of the requested data content.

In 232, the user device may send an indication to initiate the transfer or alternative initiates the transfer of requested data content.

In 234 the requested data content is transferred from the network cache 210 or alternatively from the Internet via the network cache to the user device 208, according to the determination in 228.

Now, a case will be discussed in which the mobility of user device is predicted by a centralized network entity or obtained from another party via the Internet.

Figure 3:
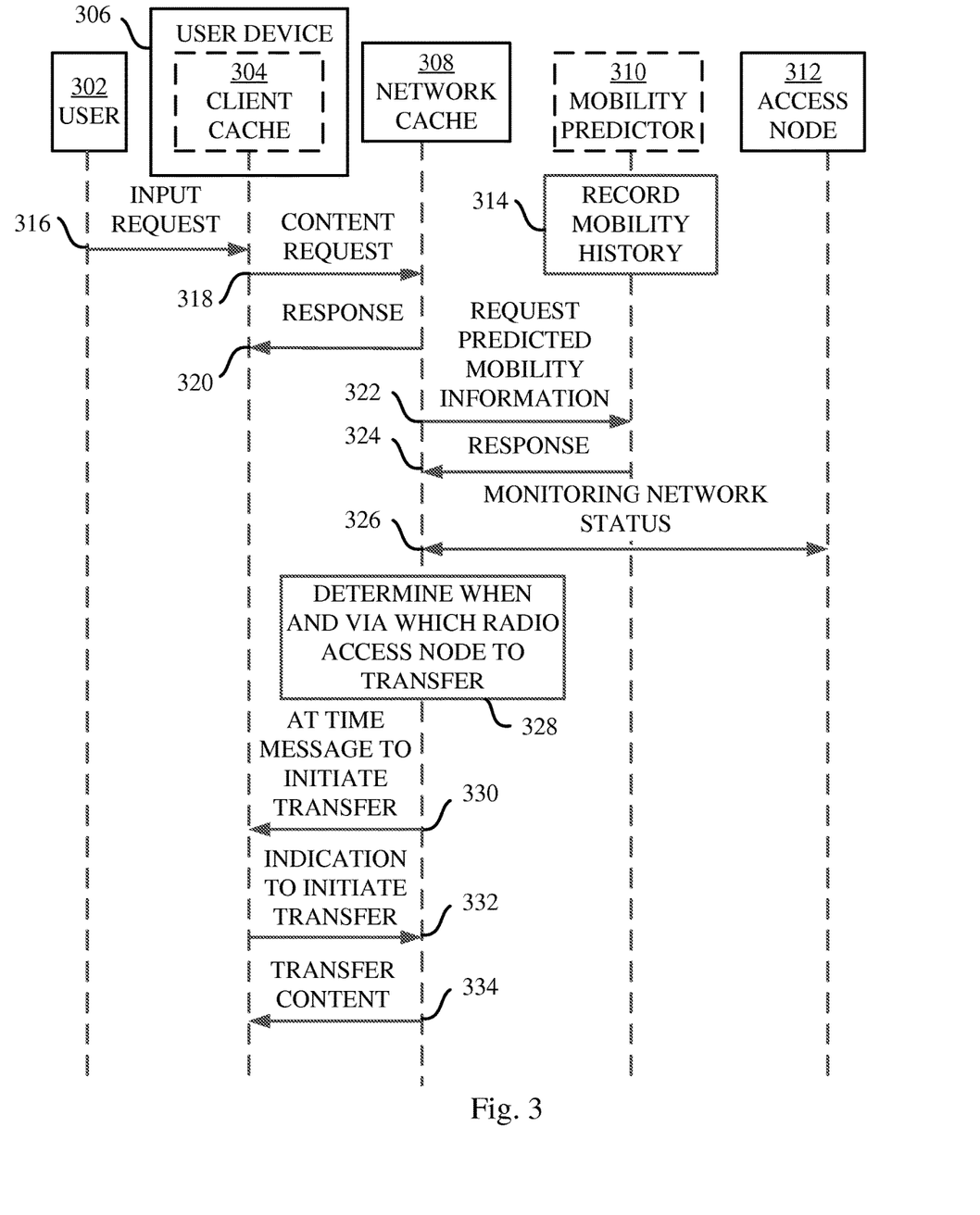

FIG. 3 presents a hand-shake diagram for said case in which mobility is not predicted by the user device itself. Signalling is performed between a user 302, a user device 306 comprising a client cache 304, a network cache 308, a mobility predictor 310 and an access node 312.

It is noted that the network cache 308 can be considered as one example of a network node.

User devices in mobile communication networks may alternatively collect history mobility information of the user devices from a call data record, or from other control plane and user plane information. An advantage to maintain mobility information in a network is the network cache only needs to interface with a centralized functionality for the mobility prediction.

The main difference between the hand-shake diagrams of FIGS. 2 and 3, is that the mobility predictor 310 in FIG. 3 is centralized, i.e. it is located in the network, in contrast to the one 204 in FIG. 2 which is comprised in the user device 208. The mobility predictor 310 of the network provides mobility information of user devices to the network cache 308. In this case a mobility predictor 204 within the user device is hence not required.

In 314 the mobility predictor 310 records the mobility history. In 316 the user 302 sends a request for data content to the user device 306. This request may comprise a deadline for transfer of requested data content. The requested data content may be specified by a uniform resource location (URL) address.

This request is now received by the client cache 304 of the user device 306.

The client cache 304 can be responsible for storing pre-fetched content, communicating with the network cache 308, receiving the request from a graphical user interface (GUI) of the user device 306 or upper layer applications.

The GUI can be used by the end user to input pre-fetch/delayed-upload content request manually, but also to receive a notification from the client cache 304. Upper layer Apps can also send content pre-fetch requests through a pre-defined interface/application programming interface.

In 318 the client cache 304 sends the request for data content to the network cache 308.

The request as communicated by the client cache 304 is communicated via a direct connection between the radio access node 312, to which the user device 306 is attached and the network cache 308.

This direct connection may be a so called "over the top" connection which uses transfer control protocol/internet protocol (TCP/IP) protocol for communicating with the network cache having an IP address on its own.

In 320 the network cache 308 sends a response to the client cache 304 to indicate whether the request is successful or not. If the network cache has no access to the requested data content the request is typically not successful, alternatively if a deadline for receipt of requested data content has already lapsed.

In 322, the network cache 308 sends a request for predicted mobility information of the user device 306 to the mobility predictor 310.

As mentioned above in the previous case in connection with FIG. 2, predicting mobility based on stored history information may be performed in a number of different ways which are well-known for a person skilled in the art, for which reason it is herein not discussed how to perform a mobility prediction.

The mobility predictor 310 can be responsible for collecting and storing history mobility information, and predicting a future location of the user device 306 based on the stored history information.

In 324, the mobility predictor 310 provides a response to the request for predicted mobility information to the network cache 308. The predicted mobility may comprise current cell of the user device 306, next several cells and cell stay time for said cells. Alternatively, the predicted mobility information may comprise on or more coverage areas of access points, with predicted stay time.

Having received the predicted mobility information, the network cache 308 communicates with radio access nodes, for example access node 312, and monitors 326 a status of the network. The network cache 308 can obtain current and statistical radio condition of the cell to which the user device is attached and of cells that the user device is predicted to visit. As indicated above, the radio access network may comprise multiple radio access types, for example 3G/long term evolution (LTE) and 802.11 of radio communication.

Similar to the previous case, the network cache can comprise a pre-cache logic module that can be the central component of the network cache, which is in charge of controlling data transfer between the client cache 304 and the network cache 308. Its main functions may comprise: receiving content request from a user device, the request including a uniform resource location (URL) of the specified requested content, mobility prediction information of the user device, and some other information such as desired deadline; monitoring radio conditions through an interface to radio access network nodes, for example, a radio base station (RBS), AP, NodeB, depending on radio access type; and controlling the time and place to deliver the content to user device.

In addition, a database may also be comprised in the network cache 308, which database comprises rules and algorithms for delivering the requested content based on different criteria, like: current radio conditions, for example available radio capacity, radio access type, deadline set by user, etc.

A content request & mobility database may further be provided in the network cache 308 and can comprise information of content requested by the user device UE, for example, content URL, deadline for transfer, predicted mobility information and etc.

Moreover, a content storage can be provided in the network cache 308 for temporarily containing the content that to be delivered to user device or uploaded by user device, according to a different use case.

Now, continuing the hand-shake diagram of FIG. 3, in 328 the network cache 308 determines when and via which radio access node to transfer the requested data content. For example, based on predicted mobility information, radio conditions, content size and the deadline, the network cache 308 determines an appropriate cell and time to deliver the requested data content to the user device requesting said data content. Load and throughput for each cell or coverage area along a predicted path may thus be considered.

The content size may be considered in the same way as described in connection with FIG. 2.

The network cache 308 determines and selects a time and a cell/coverage area for the transfer of requested data content.

In 330, at the selected time as determined in 328, the network cache 308 sends a message to the client cache 304 to initiate transfer of the requested data content.

In 332, the user device 306 may send an indication to initiate the transfer or alternative initiates the transfer of requested data content.

In 334 the requested data content is transferred from the network cache 308 or alternatively from the Internet via the network cache to the user device 306, according to the determination in 328.

Figure 4:
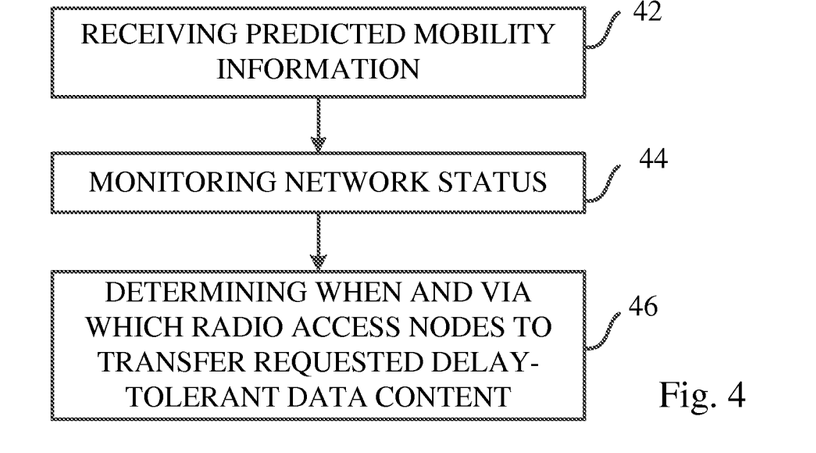
FIGS. 4, 5 and 6 show flowcharts of methods of embodiments of the present invention.

FIG. 4 shows a flowchart of a method in a network node 18, 210, 308 in a communication network for enabling transferring requested delay-tolerant data content to a user device 12, 208, 306. The method comprises receiving 222, 324, 42 information about a predicted mobility of the user device. The method also comprises monitoring 226, 326, 44 a network status of radio access nodes of the communication network, based on the received information about predicted mobility of the user device. In addition the method comprises determining 228, 328, 46 when, and via which radio access node, to transfer the requested delay-tolerant data content, based on the monitored network status of the radio access nodes.

"When" within "determining when and via which radio access node to transfer the delay-tolerant data content" is intended to mean "at what instance in time".

It is noted that the method in the network node is suitable for transfer of delay-tolerant data content on the down-link as well as on the up-link.

The method in the network node 18, 210, 308 may further comprise transferring 234, 334 the requested delay-tolerant data content to the user device according to the determination.

The information about the predicted mobility within the method may be is received 222 from the user device.

The method in the network node 18, 210, 308 may further comprise requesting 322 information about predicted mobility of the user device, from a mobility predictor 310 of the communication network or from the Internet.

The information about the predicted mobility within the method in the network node may comprise information about the predicted location of the user device, in terms of cell identity or service set identifier (SSID) with respect to time.

The network status of the radio access nodes within the method in the network node may comprise a current traffic load or throughput of the radio access nodes.

Determining when, and via which radio access node, to transfer the requested delay-tolerant data content, within the method in the network node, may comprise determining to complete the transfer of said data content before the lapse of a set time deadline.

Determining when, and via which radio access node, to transfer the requested delay-tolerant data content, within the method in the network node, may comprise determining to transfer the requested delay-tolerant data content based on the size of said data content.

The method in the network node 18, 210, 308 may further comprise sending 230, 330 to the user device information to initiate the transfer of the requested delay-tolerant data content; and receiving 232, 332 from the user device, an indication to start transferring the requested delay-tolerant data content.

Figure 5:
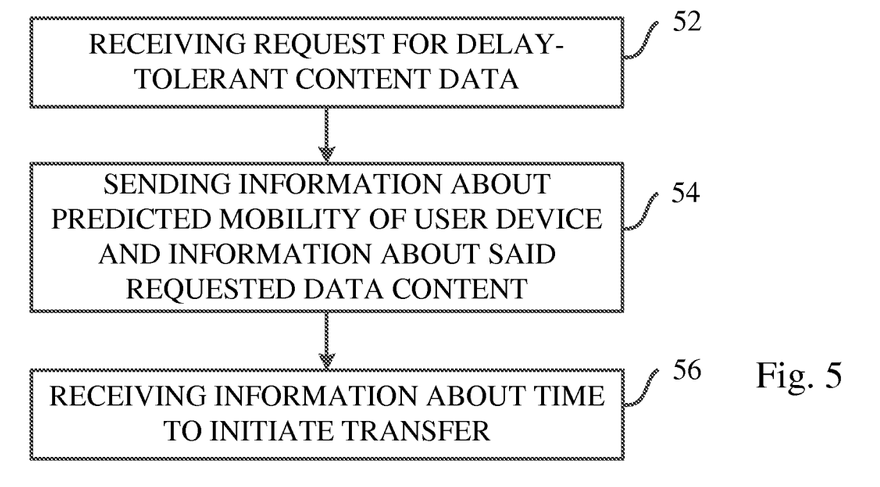

FIG. 5 shows a flowchart of a method in a user device 12, 208 for enabling transferring delay-tolerant data content between the user device and a network node 18, 210 in a communication network. The method comprises receiving 216, 52 a request for delay-tolerant data content. The method also comprises sending 222, 54 to the network node information about a predicted mobility of the user device and information about the requested delay-tolerant data content. In addition, the method comprises receiving 230, 56 information about the time when to initiate a transfer of the requested delay-tolerant data content, based on the predicted mobility of the user device.

It is noted that the method in the user device is suitable for transfer of delay-tolerant data content on the down-link as well as on the up-link.

The method in the user device 12, 208 may further comprise receiving 234 the requested delay-tolerant data content from the network, based on the predicted mobility of the user device.

The method in the user device may further comprise obtaining 214 information about a recorded history of a mobility of the user device; and predicting 219 a mobility of the user device, based on the obtained information about the recorded history of the mobility.

The method in the user device may further comprise sending 232 an indication to the network node to start transferring the requested delay-tolerant data content to the user device.

Figure 6:
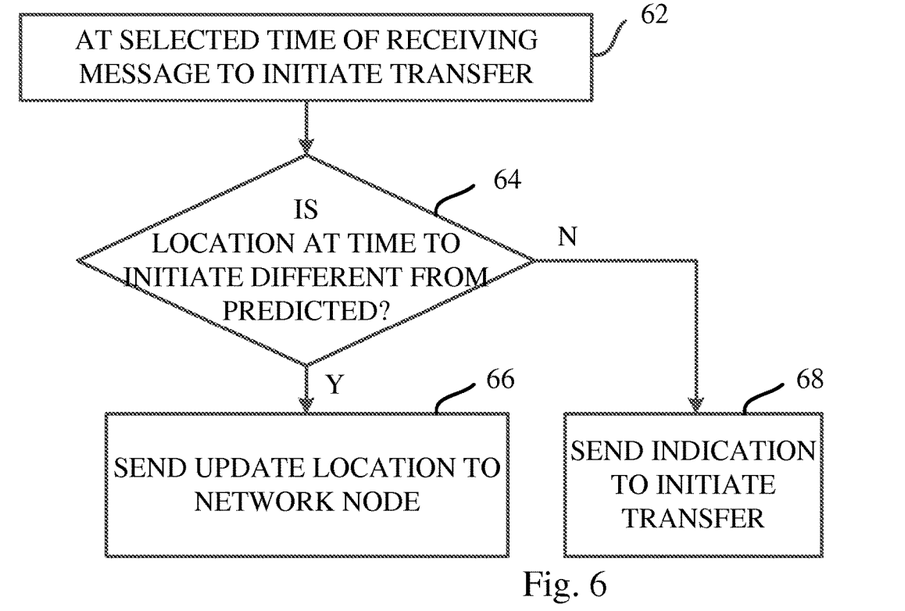

FIG. 6 presents a flowchart of an optional part of the method in the user device. This optional part can be performed at the time of the user device receiving a message to initiate the transfer of requested data content, i.e. at 230 of the flowchart in FIG. 2 or 330 of the flowchart in FIG. 3. The method in the user device may thus further comprise, at the time of receiving 62 of the message to initiate the transfer of requested data content, obtaining a current actual location of the user device in terms of a cell or local network identifier, such as a SSID. User devices can namely nowadays determine their location with considerable accuracy.

In 64 the method comprises to compare the current actual location of the user device with the predicted location of the user device. If it is determined in 64 that the cell or local network identifier of the current actual location is different from the predicted location of the user device in terms of predicted cell or local network identifier, the method comprises sending 66 to the network node information about the current actual location of the user device as one kind of location update.

Having sent the location update, an updated request for the delay-tolerant data content can be sent to the network cache 210 in a second step 222. Alternatively, current actual location information of the user device is sent to the network cache 210 in a new message, based on which the network cache can determine 228 the time and via which radio access node to transfer the requested delay-tolerant data content.

According to another embodiment, current actual location information as obtained from the comparison in 64 and send in step 66 can be sent to the network cache 308, based on which the network cache determines 328 the time and via which radio access node to transfer the requested delay-tolerant data content.

In this way, location information that is typically more accurate than predicted mobility information can be used.

If there is no difference determined in 64, i.e. that the cell identity or the SSID of current and predicted location are the same, the method in the user device further comprises to send 68 an indication to the network cache 210 to initiate the transfer or to initiate the transfer, such that the network cache transfers the requested data content.

Figure 7:
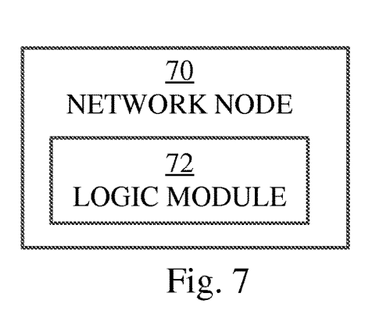
FIGS. 7 and 9 are block diagrams schematically illustrating a network node of embodiments of the present invention.

The flowchart of FIG. 6 is hence applicable for both the case in which the mobility predictor is located in the user device, for instance as illustrated in FIG. 2, and the case in which it is located in the network, i.e. external to the user device, for instance as illustrated in FIG. 3. FIG. 7 is a block diagram schematically illustrating a network node 70 of embodiments of the present invention. This network node is adapted to enable transferring requested delay-tolerant data content to a user device. The network node comprises a logic module 72 that is adapted to receive 222, 324, 42 information about a predicted mobility of the user device. The logic module is further adapted to monitor 226, 326, 44 a network status of radio access nodes of a communication network to which the network node belong, based on the information about the predicted mobility of the user device. In addition, the logic module is adapted to determine 228, 328, 46 when, and via which one of the radio access nodes, to transfer the requested delay-tolerant data content, based on the monitored network status of the radio access nodes.

The network node may further be adapted to transfer 234, 334 the requested delay-tolerant data content to the user device according to the determination.

The network node may further be adapted to receive the information about the predicted mobility from the user device or to receive 322 the information about the predicted mobility from a mobility predictor 310 of the communication network or from the Internet.

The information about the predicted mobility within the method of the network node may further comprise information about the predicted location of the user device, in terms of cell identity or SSID with respect to time.

The logic module 72 of the network node 70 may further be adapted to monitor a current traffic load or throughput of the radio access node.

The logic module 72 of the network node 70 may further be adapted determine to complete the transfer of said data content before the lapse of a set time deadline.

The logic module 72 of the network node 70 may further be adapted to determine to transfer the requested delay-tolerant data content based on the size of said data content.

The network node may further comprise a network cache 18, 210, 308 that has an Internet Protocol (IP) address that enables the network cache to be connected to a client cache of the user device 12, 208 via a Transfer Control Protocol (TCP)/IP connection.

Figure 8:
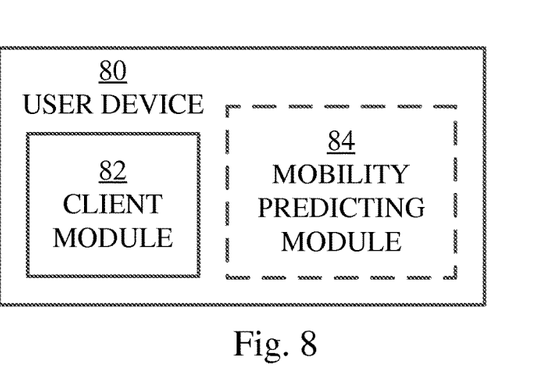
FIGS. 8 and 10 are block diagram schematically illustrating a user device of embodiments of the present invention.

FIG. 8 is a block diagram schematically illustrating a user device 80 of embodiments of the present invention. This user device 80 is adapted to enable transferring delay-tolerant data content between the user device and a network node 18, 210, 70 in a communication network. The user device comprises a client module 82 that is adapted to receive 216, 52 a request for the delay-tolerant data content. The client module 82 is further adapted to send 222, 54 to the network node, information about a predicted mobility of the user device and information about the requested delay-tolerant data content. In addition, the client module 82 is further adapted to receive 230, 56 information about when to initiate a transfer of the requested delay-tolerant data content, based on the predicted mobility of the user device.

The client module of the user device is further adapted to receive 234 the requested delay-tolerant data content from the network, based on the predicted mobility of the user device.

The user device may further comprise a mobility predicting module 84 that is adapted to obtain 214 information about a recorded history of the mobility of the user device; and to predict 219 the mobility of the user device, based on the obtained information about the recorded history of mobility.

The client module of the user device is further adapted to send 232 an indication to the network node to start transferring the delay-tolerant data content to the user device.

The client module of the user device is further adapted to at the time when to initiate the transfer, obtain a current actual location of the user device in terms of a cell or local network identifier. The client module is adapted to send 66 to the network node information about the current actual location of the user device and a request for the delay-tolerant data content, if this cell or local network identifier is different 64 from the predicted location of the user device in terms of a predicted cell or local network identifier.

The user device is further adapted to comprise a client cache 206 that has an IP address, which enables the client cache to be connected to a network cache 210 of a network node via a TCP/IP connection.

Figure 9:
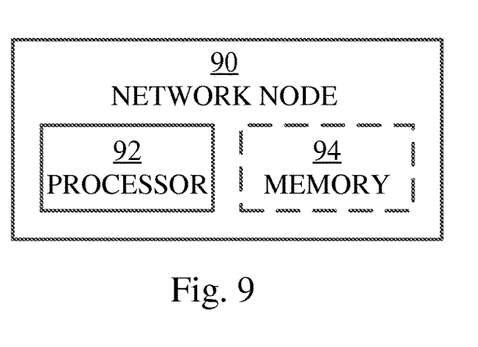

FIG. 9 is a block diagram schematically illustrating a network node 90 of embodiments of the present invention. This network node is adapted to enable transferring requested delay-tolerant data content to a user device. The network node comprises a processor 92 and a memory 94 that stores a computer program comprising computer program code. When this computer program code is run in the processor 92, it causes the network node 90 to receive 222, 324, 42 information about a predicted mobility of the user device. The computer program code further causes the network node to monitor 226, 326, 44 a network status of radio access nodes of a communication network to which the network node belong, based on the information about the predicted mobility of the user device. In addition, when the computer program code is run in the processor 92 it causes the network node 90 to determine 228, 328, 46 when, and via which one of the radio access nodes, to transfer the requested delay-tolerant data content, based on the monitored network status of the radio access nodes.

Some embodiments of the present invention also relate to a computer program for enabling transferring requested delay-tolerant data content to a user device 12, 208, 306, 80 from a network node 18, 210, 308, 70, 90 of a communication network. The computer program comprises computer program code which, when run in a processor of the network node, causes the network node to receive 222, 324, 42 information about a predicted mobility of the user device. The computer program code also causes the network node to monitor 226, 326, 44 a network status of radio access nodes of a communication network to which the network node belong, based on the information about the predicted mobility of the user device. In addition, the computer program code, when run in the processor, causes the network node to determine 228, 328, 46 when, and via which one of the radio access nodes, to transfer the requested delay-tolerant data content, based on the monitored network status of the radio access nodes.

Figure 10:
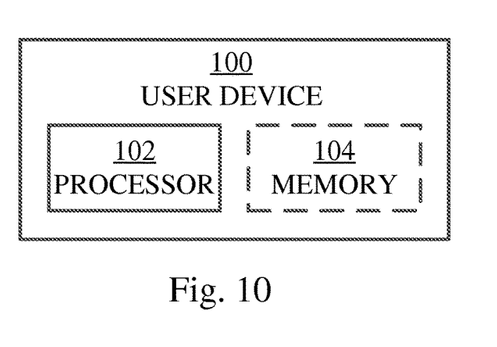

FIG. 10 is a block diagram schematically illustrating a user device 100 of some embodiments of the present invention. The user device 100 is adapted to enable transferring requested delay-tolerant data content between the user device and a network node 18, 210, 70, 90 in a communication network. The user device comprises a processor 102 and a memory 104 that stores a computer program. This computer program comprises computer program code which, when run in the processor, causes the user device to receive 216, 52 a request for the delay-tolerant data content. This computer program code causes the user device to send 222, 54 to the network node, information about a predicted mobility of the user device and information about the requested delay-tolerant data content. In addition, when the computer program code is run in the processor 102 it causes the user device 100 to receive 230, 56 information about when to initiate a transfer of the requested delay-tolerant data content, based on the predicted mobility of the user device.

Some embodiments of the present invention also relate to a computer program for enabling transferring requested delay-tolerant data content between a user device 12, 208, 80, 100 and a network node 18, 210, 70, 90 in a communication network. The computer program comprises computer program code which, when run in a processor of the user device, causes the user device to receive 216, 52 a request for the delay-tolerant data content. The computer program code causes the user device to send 222, 54 to the network node, information about a predicted mobility of the user device and information about the requested delay-tolerant data content. In addition, the computer program code, when run in the processor, causes the user device to receive 230, 56 information about when to initiate a transfer of the requested delay-tolerant data content, based on the predicted mobility of the user device.

Embodiments of the present invention provide a number of advantages of which a few are:

By considering the radio condition of several cells or SSIDs of radio access nodes, transfer of requested data content can be delivered in a cell or SSID when the load is low or the throughput is high. An efficient utilization of radio resources is thus obtained. An optimal timing for transfer can be obtained.

For example, if a current cell throughout has a high load according to history statistic, and if it is predicted that a user device will visit a low load cell or a SSID of a high throughput radio network, for instance Wi-Fi, before a deadline specified by user device, the data content can de transferred in those low load cells or high throughput Aps. For this reason, traffic can be off-loaded from highly loaded cells, with the result of an improved quality of experience.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

AP access point
GUI graphic user interface
LTE long term evolution
URL uniform resource location

The invention claimed is:

1. A method in a network cache of a communication network for enabling transferring of requested delay-tolerant data content from the network cache to a user device, the method comprising:
receiving information about a predicted mobility of the user device, the predicted mobility including movement of the user device between radio access nodes of the communication network;
monitoring a network status of the radio access nodes of the communication network, based on the received information about the predicted mobility of the user device;
determining when, and via which radio access node, to transfer the requested delay-tolerant data content from the network cache to the user device, based on the monitored network status of the radio access nodes; and
in response to determining when, and via which radio access node, to transfer the requested delay-tolerant data content, transferring the requested delay-tolerant data content from the network cache to the user device according to determining the transfer of the requested delay-tolerant data content, wherein the transfer is by an over-the-top connection link between the network cache and the user device, via the determined radio access node, and utilizing Transfer Control Protocol/Internet Protocol (TCP/IP) to communicate, in which the network cache has its own IP address to communicate with the user device.

2. The method in the network cache according to claim 1, wherein the information about the predicted mobility is determined at the user device.

3. The method in the network cache according to claim 1, further comprising requesting information about the predicted mobility of the user device from a mobility predictor of the communication network or from the Internet.

4. The method in the network cache according to claim 1, wherein information about the predicted mobility comprises information about a predicted location of the user device, in terms of cell identity or service set identifier (SSID) with respect to time.

5. The method in the network cache according to claim 1, wherein the monitored network status of the radio access nodes comprises a current traffic load or throughput of the radio access nodes.

6. The method in the network cache according to claim 1, wherein the determining when, and via which radio access node, to transfer the requested delay-tolerant data content comprises determining to complete the transfer of the requested delay-tolerant data content before lapse of a set time deadline.

7. The method in the network cache according to claim 1, wherein the determining when, and via which radio access node, to transfer the requested delay-tolerant data content, comprises determining to transfer the requested delay-tolerant data content based on a size of the requested delay-tolerant data content.

8. The method in the network cache according to claim 1, further comprising:
sending to the user device, information to initiate the transfer of the requested delay-tolerant data content; and
receiving from the user device, an indication to start transferring the requested delay-tolerant data content.

9. A network cache for enabling transferring of requested delay-tolerant data content to a user device, the network cache comprising:

a logic module adapted to:
  receive information about a predicted mobility of the user device, the predicted mobility including movement of the user device between radio access nodes of a communication network;
  monitor a network status of the radio access nodes of the communication network to which the network cache belong, based on the information about the predicted mobility of the user device; and
  determine when, and via which one of the radio access nodes, to transfer the requested delay-tolerant data content from the network cache to the user device, based on the monitored network status of the radio access nodes; and
  in response to determining when, and via which radio access node, to transfer the requested delay-tolerant data content, transfer the requested delay-tolerant data content from the network cache to the user device according to determining the transfer of the requested delay-tolerant data content, wherein the transfer is by an over-the-top connection link between the network cache and the user device, via the determined radio access node, and utilizing Transfer Control Protocol/Internet Protocol (TCP/IP) to communicate, in which the network cache has its own IP address to communicate with the user device.

10. The network cache according to claim 9, wherein the logic module further is adapted to receive the information about the predicted mobility determined at the user device or to receive the information about the predicted mobility from a mobility predictor of the communication network or from the Internet.

11. The network cache according to claim 9, wherein information about the predicted mobility comprises information about a predicted location of the user device, in terms of cell identity or service set identifier (SSID) with respect to time.

12. The network cache according to claim 9, wherein the logic module is adapted to monitor a current traffic load or throughput of the radio access nodes.

13. The network cache according to claim 9, wherein the logic module is adapted to determine to complete the transfer of the requested delay-tolerant data content before lapse of a set time deadline.

14. The network cache according to claim 9, wherein the logic module is adapted to determine to transfer the requested delay-tolerant data content based on a size of the requested delay-tolerant data content.

15. A method in a user device for enabling transferring of delay-tolerant data content from a network cache to the user device in a communication network, the method comprising:
  requesting for the delay-tolerant data content;
  sending to the network cache information about a predicted mobility of the user device and information about the requested delay-tolerant data content, the predicted mobility including movement of the user device between locations associated with different radio access nodes of the communication network;
  receiving information about a time when to initiate a transfer of the requested delay-tolerant data content from the network cache to the user device, based on the predicted mobility of the user device; and
  in response to receiving information about when to initiate the transfer of the requested delay-tolerant data content, receiving transfer of the requested delay-tolerant data content from the network cache at a time based on the received information for initiating the transfer, wherein the transfer is by an over-the-top connection link between the network cache and the user device, and utilizing Transfer Control Protocol/Internet Protocol (TCP/IP) to communicate with the network cache, in which the network cache has its own IP address to communicate with the user device.

16. The method in the user device according to claim 15, further comprising:
  obtaining information about a recorded history of a mobility of the user device; and
  predicting the mobility of the user device, based on the obtained information about the recorded history of the mobility.

17. The method in the user device according to claim 15, further comprising sending an indication to the network cache to start transferring the requested delay-tolerant data content to the user device.

18. The method in the user device according to claim 15, further comprising, at the time when to initiate the transfer, obtaining a current actual location of the user device in terms of a cell or local network identifier, and when the cell or local network identifier is different from a predicted location of the user device in terms of a predicted cell or local network identifier, sending to the network cache information about the current actual location of the user device and a request for the delay-tolerant data content.

19. A user device for enabling transferring of delay-tolerant data content from a network cache to the user device in a communication network, the user device comprising a client module adapted to:
  request for the delay-tolerant data content;
  send to the network cache, information about a predicted mobility of the user device and information about the requested delay-tolerant data content, the predicted mobility including movement of the user device between locations associated with different radio access nodes of the communication network;
  receive information about when to initiate a transfer of the requested delay-tolerant data content from the network cache to the user device, based on the predicted mobility of the user device; and
  in response to receiving information about when to initiate the transfer of the requested delay-tolerant data content, receive transfer of the requested delay-tolerant data content from the network cache at a time based on the received information for initiating the transfer, wherein the transfer is by an over-the-top connection link between the network cache and the user device, and utilizing Transfer Control Protocol/Internet Protocol (TCP/IP) to communicate with the network cache, in which the network cache has its own IP address to communicate with the user device.

20. The user device according to claim 19, further comprising a mobility predicting module adapted to obtain information about a recorded history of the mobility of the user device; and to predict the mobility of the user device, based on the obtained information about the recorded history of the mobility of the user device.

21. The user device according to claim 19, wherein the client module further is adapted to send an indication to the network cache to start transferring the delay-tolerant data content to the user device.

22. The user device according to claim 19, wherein the client module further is adapted to, at the time when to initiate the transfer, obtain a current actual location of the user device in terms of a cell or local network identifier, and when the cell or local network identifier is different from a predicted location of the user device in terms of a predicted cell or local network identifier, send to the network cache information about the current actual location of the user device and a request for the delay-tolerant data content.

23. A network cache for enabling transferring of requested delay-tolerant data content to a user device, the network cache comprising:
   a processor; and
   a non-transitory memory storing a computer program comprising computer program code which, when run on the processor, causes the network cache to:
      receive information about a predicted mobility of the user device, the predicted mobility including movement of the user device between radio access nodes of a communication network;
      monitor a network status of the radio access nodes of the communication network to which the network cache belong, based on the information about the predicted mobility of the user device;
      determine when, and via which one of the radio access nodes, to transfer the requested delay-tolerant data content from the network cache to the user device, based on the monitored network status of the radio access nodes; and
      in response to determining when, and via which radio access node, to transfer the requested delay-tolerant data content, transfer the requested delay-tolerant data content from the network cache to the user device according to the determining the transfer of the requested delay-tolerant data content, wherein the transfer is by an over-the-top connection link between the network cache and the user device, via the determined radio access node, and utilizing Transfer Control Protocol/Internet Protocol (TCP/IP) to communicate, in which the network cache has its own IP address to communicate with the user device.

24. A non-transitory computer readable storage medium containing instructions, which when executed by a processor in a network cache of a communication network, enable transferring of requested delay-tolerant data content from the network cache to a user device by causing the network cache to:
   receive information about a predicted mobility of the user device, the predicted mobility including movement of the user device between radio access nodes of the communication network;
   monitor a network status of the radio access nodes of the communication network to which the network cache belong, based on the information about the predicted mobility of the user device;
   determine when, and via which one of the radio access nodes, to transfer the requested delay-tolerant data content from the network cache to the user device, based on the monitored network status of the radio access nodes; and
   in response to determining when, and via which radio access node, to transfer the requested delay-tolerant data content, transfer the requested delay-tolerant data content from the network cache to the user device according to the determining the transfer of the requested delay-tolerant data content, wherein the transfer is by an over-the-top connection link between the network cache and the user device, via the determined radio access node, and utilizing Transfer Control Protocol/Internet Protocol (TCP/IP) to communicate, in which the network cache has its own IP address to communicate with the user device.

25. A user device for enabling transferring requested delay-tolerant data content from a network cache to the user device in a communication network, the user device comprising:
   a processor; and
   a non-transitory memory storing a computer program comprising computer program code which, when run on the processor, causes the user device to:
      request for the delay-tolerant data content;
      send to the network cache, information about a predicted mobility of the user device and information about the requested delay-tolerant data content, the predicted mobility including movement of the user device between locations associated with different radio access nodes of the communication network;
      receive information about when to initiate a transfer of the requested delay-tolerant data content from the network cache to the user device, based on the predicted mobility of the user device; and
      in response to receiving information about when to initiate the transfer of the requested delay-tolerant data content, receive transfer of the requested delay-tolerant data content from the network cache at a time based on the received information for initiating the transfer, wherein the transfer is by an over-the-top connection link between the network cache and the user device, and utilizing Transfer Control Protocol/Internet Protocol (TCP/IP) to communicate with the network cache, in which the network cache has its own IP address to communicate with the user device.

26. The user device according to claim 25, comprising a mobile phone.

27. A non-transitory computer readable storage medium containing instructions, which when executed by a processor in a user device, enable transferring of requested delay-tolerant data content from a network cache in a communication network to the user device by causing the user device to:
   request for the delay-tolerant data content;
   send to the network cache, information about a predicted mobility of the user device and information about the requested delay-tolerant data content, the predicted mobility including movement of the user device between locations associated with different radio access nodes of the communication network;
   receive information about when to initiate a transfer of the requested delay-tolerant data content from the network cache to the user device, based on the predicted mobility of the user device; and
   in response to receiving information about when to initiate the transfer of the requested delay-tolerant data content, receive transfer of the requested delay-tolerant data content from the network cache at a time based on the received information for initiating the transfer, wherein the transfer is by an over-the-top connection link between the network cache and the user device, and utilizing Transfer Control Protocol/Internet Protocol (TCP/IP) to communicate with the network cache, in which the network cache has its own IP address to communicate with the user device.

* * * * *